United States Patent [19]

Metz

[11] Patent Number: 4,555,211
[45] Date of Patent: * Nov. 26, 1985

[54] TRUCK LOCKING DEVICE

[76] Inventor: Donald L. Metz, 7459 Song Lake Rd., Tulley, N.Y. 13159

[*] Notice: The portion of the term of this patent subsequent to Aug. 23, 2000 has been disclaimed.

[21] Appl. No.: 504,337

[22] Filed: Jun. 14, 1982

Related U.S. Application Data

[63] Continuation-in-part of Ser. No. 387,314, Jun. 11, 1982, Pat. No. 4,400,127, which is a continuation-in-part of Ser. No. 356,006, Mar. 8, 1982, abandoned.

[51] Int. Cl.⁴ .................. B65G 67/02; B65G 69/00; G05G 5/06
[52] U.S. Cl. ........................................ 414/401; 410/7
[58] Field of Search ................. 414/396, 401, 584; 410/3, 4, 7, 51, 56; 292/201; 14/71.1

[56] References Cited

U.S. PATENT DOCUMENTS

| 511,021 | 12/1893 | Kidd | 414/362 |
|---|---|---|---|
| 656,074 | 8/1900 | Wood | 414/401 |
| 2,543,295 | 2/1951 | McGregor et al. | 414/389 |
| 2,954,241 | 2/1958 | Warren | 280/476 |
| 3,924,709 | 12/1975 | Swanson | 186/1 |
| 4,127,856 | 11/1978 | Bickel | 414/401 X |
| 4,146,888 | 3/1979 | Grunewald et al. | 414/401 X |
| 4,194,854 | 3/1980 | Mauldin | 404/110 |
| 4,208,161 | 6/1980 | Hipp et al. | 414/401 |
| 4,264,259 | 4/1981 | Hipp | 414/401 |
| 4,267,748 | 5/1981 | Grunewald et al. | 414/401 X |
| 4,282,621 | 8/1981 | Anthony et al. | 414/401 X |
| 4,373,847 | 2/1983 | Hipp et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennet et al. | 414/401 X |

FOREIGN PATENT DOCUMENTS 51-93571 8/1976 Japan.

Primary Examiner—Robert J. Spar
Assistant Examiner—Stuart J. Millman
Attorney, Agent, or Firm—Sughrue, Mion, Zinn, Macpeak and Seas

[57] ABSTRACT

The truck locking device includes a flat substantially triangular shaped support member having a vertically extending surface and an inclined surface, a pair of locking arms pivoted adjacent the intersection of the vertical and inclined surface on opposite sides of the support member, a pair of double acting pneumatic cylinders mounted on opposite sides of said support member for moving the locking arms into and out of engagement with a standard ICC bar on the back of a truck and an activating arm pivoted on the support member for pivotal movement under the influence of the bar as it is moved over the locking device to operate a valve to cause the pneumatic cylinders to move the arms upwardly for engagement with the bar to lock the truck in position relative to a loading dock or the like. A second valve is provided for activating the cylinders for retracting the locking arms upon completion of a loading or unloading operation to release the truck. Upon departure of the truck the activating arm is spring biased to its original position for a subsequent truck locking operation.

5 Claims, 7 Drawing Figures

TRUCK LOCKING DEVICE

CROSS REFERENCE TO RELATED APPLICATION

The present application is a continuation in part of application Ser. No. 387,314, filed June 11, 1982, now U.S. Pat. No. 4,400,127, granted Aug. 23, 1983, which is a continuation in part of application Ser. No. 356,006, filed Mar. 8, 1982 now abandoned.

BACKGROUND OF THE INVENTION

The present invention is directed to a truck locking device and more specifically to a mechanically or pneumatically operated locking device for automatically engaging the standard ICC bar on the rear of a truck to lock the truck in a fixed position relative to a loading dock or the like.

At all loading docks there is an imminent danger of trucks leaving the loading dock while a loading or unloading operation is still in progress. This presents a very real danger for personnel operating lift trucks for transporting cargo into or out of the truck since the unannounced departure of a truck from the loading dock could cause the lift truck to fall from the loading dock or the back of the truck. A similar problem exists with respect to trailers which are parked at a loading dock without a tractor. The shocks and vibrations transmitted to a trailer during the loading and unloading operations can cause the trailer to drift away from the dock or even cause the landing gear to collapse and drop the trailer forward in the driveway away from the loading dock.

Such accidents occur fairly frequently and various attempts have been made to secure a truck to a loading dock during loading and unloading operations and/or provide a system of signal lights to alert dock personnel as well as drivers as to the status of the loading or unloading operation. The most common method of preventing such accidents is to manually place rubber or metal wheel chocks in front of the truck wheels when the truck is parked at the loading platform. While this is fairly effective, it is entirely dependent upon having a person perform this function and as a result, it is estimated that only 25 percent of the trucks are actually chocked.

Other arrangements for securing a truck to a loading dock involve the use of a hook adapted to engage some portion of the truck with the hook being operatively connected to a suitable retaining means on the loading dock. Once again, these various arrangements all require the assistance of an operator to engage the hook and take up any slack in the retaining means. As a result, trucks are often not secured to the loading dock.

SUMMARY OF THE INVENTION

The present invention provides a new and improved truck locking device which is capable of automatically locking a truck in a fixed position as the truck is backed into position. While manually operated means are provided for releasing the locking device at the completion of the loading operation, the engagement of the locking device is completely automatic.

The present invention provides a new and improved truck locking device which is adapted to be mounted on the ground immediately in front of a loading dock so as to prevent interference of the truck locking device with the operation of a dock leveling device and vice versa.

The use of a ground support for the locking device also allows the locking device to be used to secure trailers at selected spot locations in a parking lot remote from the loading dock.

The present invention provides a new and improved truck locking device comprising a support member adapted to be secured on a suitable horizontally disposed support surface, horizontally extending pivot means secured to the upper end of said support means, locking arm means having projections thereon for engaging the standard ICC bar of a truck pivotally mounted on said pivot means, spring means normally biasing said locking arm means upwardly into engagement with said ICC bar, latch means for securing said locking arm means to said support means in a lower retracted position and activating arm means pivotally mounted on said support means in operative engagement with said latch means whereby upon engagement of said ICC bar on a backing truck with the activating arm means, the activating arm means will be pivoted to release said latch means thereby allowing said locking arm means to pivot upwardly into locking engagement with the ICC bar to lock said truck in position relative to said support means.

The present invention provides a new and improved truck locking device comprising a support member adapted to be secured to a suitable horizontally disposed support surface, horizontally extending pivot means secured to the upper end of said support means, locking arm means having projections thereon for engaging the standard ICC bar of a truck pivotally mounted on said pivot means, pneumatic means for moving said locking arms into and out of engagement with said ICC bar, activating arm means pivotally mounted on said support means for engagement by said ICC bar for operating said pneumatic means to move said locking arm means upwardly into engagement with said ICC bar and manual means for operating said pneumatic means for moving said locking arm means out of engagement with said ICC bar.

The foregoing and other objects, features and advantages of the invention will be apparent from the following more particular description of a preferred embodiment of the invention as illustrated in the accompanying drawings.

DETAILED DESCRIPTION OF THE INVENTION

The truck locking device 10 as shown in the drawings is comprised of a support member 12 in the form of a substantially triangular flat steel plate having a thickness of approximately 1 inch. Two feet 14 in the form of angle irons are secured to each side of the support member 12 by means of welding or the like adjacent the bottom edge thereof. The horizontal portions of each foot 14 may be provided with holes for receiving bolts which are set in concrete in order to securely position the support member 12 in close proximity to a loading dock 16. The support member 12 is disposed perpendicular to the front wall of the loading dock 16 and is spaced as close as possible to the wall so as to provide an operating clearance for the locking arms 18 and 20. A horizontally disposed stud 22 extends through and is secured in an aperture in the uppermost end of the support member 12 to provide two horizontally disposed locking arm supports. The stud 22 is provided with annular grooves 23 on opposite side of the support member 12 to define break-away points should excessive forces be applied to the stud. The locking arms 18 and 20 are pivotally mounted on the oppositely extending portions of the stud 22. The locking arms 18 and 20 are spaced from the support member 12 by means of a pair of spacers 26 and a pair of bushings 24 are spaced from the locking arms 18 and 20 by a pair of washers 28 and are secured in position by means of washers 28 and lock nuts 30 threaded on the opposite ends of the stud 22. A U-shaped spring locking arm 32 is provided with a horizontally extending portion 36 which is secured in a notch 34 located in the vertical edge of the support member 12. The two legs of the spring locking arm 32 are coiled about the bushings 24 with the opposite ends thereof secured in apertures 38 in the locking arms 18 and 20. The legs of the spring locking arm are coiled about the bushings 24 in a direction to normally bias the locking arms 18 and 20 in the counterclockwise direction as viewed in FIG. 1.

Figure 1:
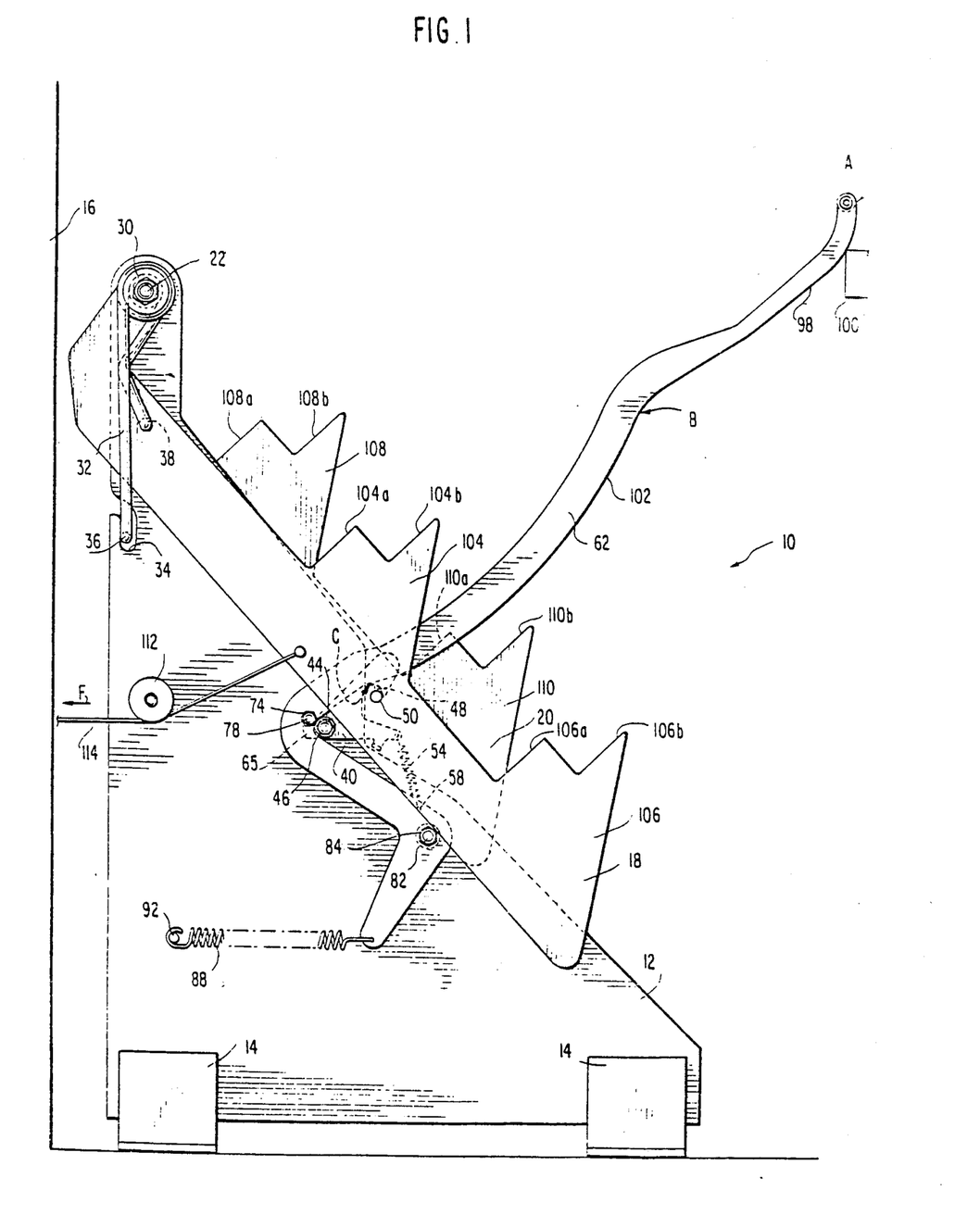
FIG. 1 is a side elevation view of the truck locking device according to the present invention with the locking arms in the lower latched positions relative to the support means.
Figure 3:
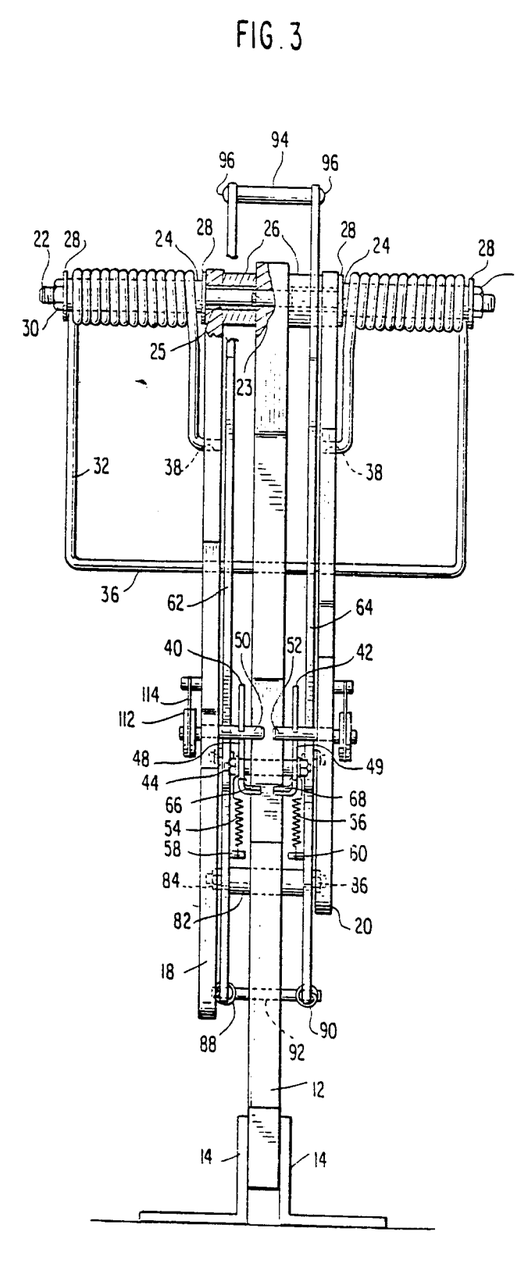
FIG. 3 is an end elevation view of the truck locking device shown in FIG. 1.
Figure 4:
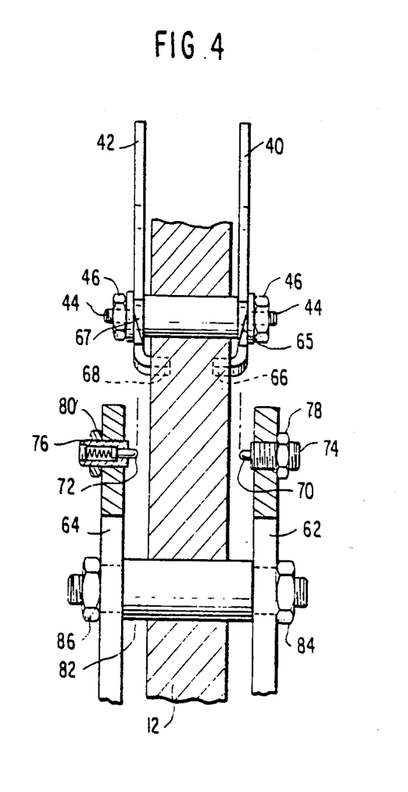
FIG. 4 is an enlarged sectional view along the line 4—4 in FIG. 2 showing the details of the latching means for the locking arm.

When the locking device is not in use the locking arms 18 and 20 are secured in their lower retracted position as shown in FIGS. 1 and 3 by means of a pair of latch members 40 and 42, respectively. The latch members 40 and 42 are pivotally mounted on a common pivot pin 44 which extends through an aperture in the support member 12. The latch members 40 and 42 are secured on the pivot pin 44 by means of locknuts 46 threaded on the opposite ends thereof. The latch members 40 and 42 are provided with identical recesses 48 and 49 for receiving locking pins 50 and 52, respectively. The locking pins 50 and 52 are secured in apertures in the locking arms 18 and 20 by any suitable means. A pair of springs 54 and 56 are connected at one end to the latch members 40 and 42, respectively, and at the other end to anchor pins 58 and 60, respectively, which are secured to activating arms 62 and 64. The springs 54 and 56 normally bias the latch member about the pivot pin 44 in the clockwise direction with the rotation of the latch members being limited in this direction by laterally extending ears 66 and 68 which are adapted to engage the inclined upper surface of the support member 12. The latch members 40 and 42 are further provided with operating projections 65 and 67 respectively, the upper surfaces of which are disposed in engagement with spring biased plungers 70 and 72 which are carried by the activating arms 62 and 64, respectively. The spring biased plungers are located in sleeves 74 and 76, respectively, which are threaded into apertures in the activating arm 62 and 64, respectively, and retained in adjusted position by means of locknuts 78 and 80, respectively. The upper surfaces of the projections 65 and 67 have a width equal to the width of each latching member with the lower edge portions being beveled as shown in FIG. 4 to allow for a resetting of the activating arm in a manner which will be described hereinafter.

The activating arms 62 and 64 are pivotally mounted on opposite ends of a stud 82 which is secured in an aperture in the support member 12 by any suitable means. The activating arms are secured on the ends of the stud 82 by locknuts 84 and 86, respectively. The activating arms 62 and 64 are normally biased into the position shown in FIG. 1 by means of springs 88 and 90 which are connected at their opposite ends to the activating arms 62 and 64, respectively, and a common anchor pin 92 which is secured in an aperture in the support member 12 by any suitable means. The upper ends of the activating arms 62 and 64 are connected together by means of a spacer element 94 and screws 96 in order to stabilize the activating arms and maintain them parallel to each other for proper operation of the locking device.

Figure 2:
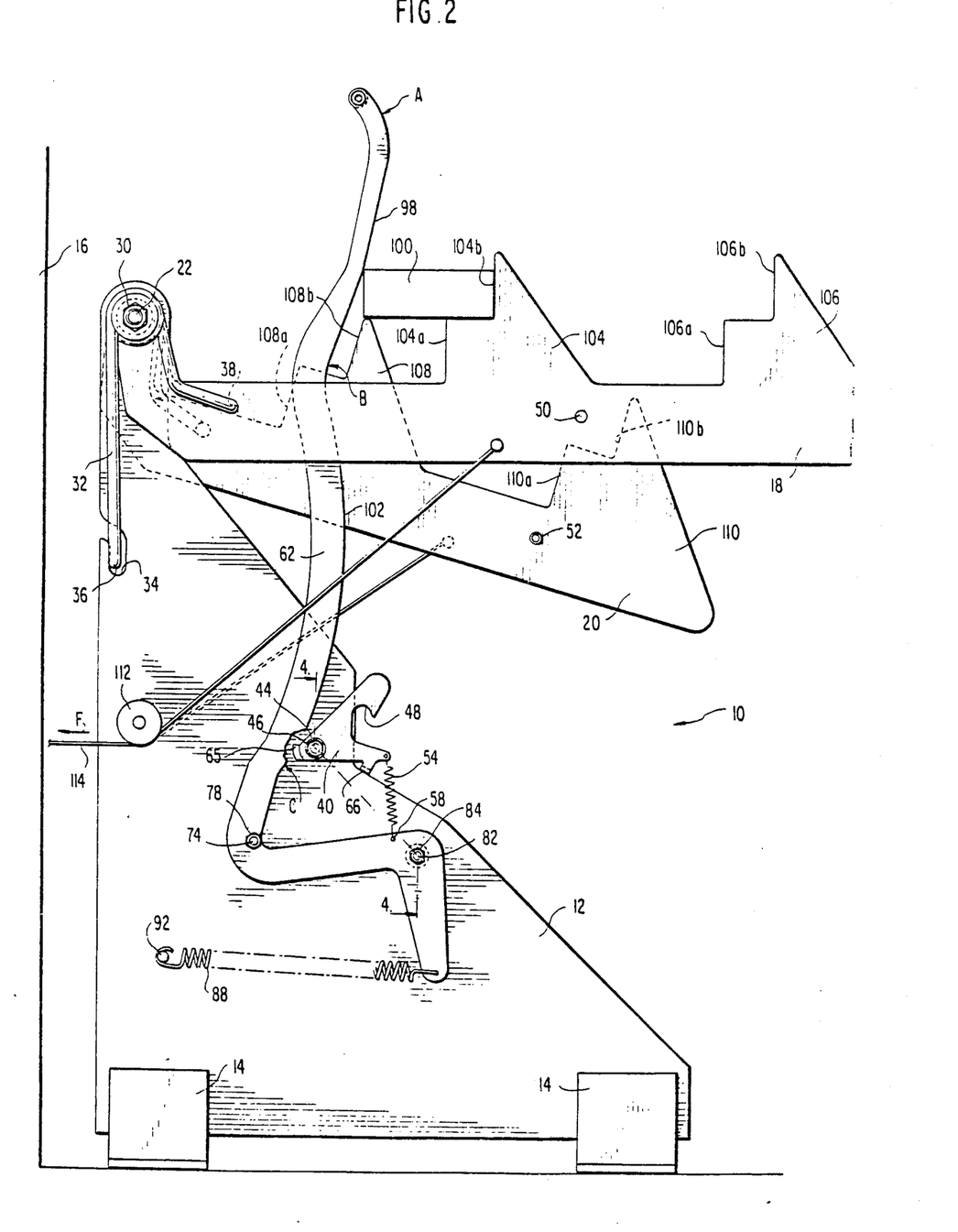
FIG. 2 is a side elevation view similar to FIG. 1 showing the locking arms in the raised truck locking position.

The upper ends of the activating arms are provided with first camming surfaces 98 which extend approximately from point A to point B which are adapted to be engaged by a standard ICC bar 100 which depends from the rear bumper of most trucks and trailers. The activating arms are provided with second cam surfaces 102 which extend substantially from point B to point C for engagement by the locking pins 50 and 52 to control the counterclockwise pivotal movement of the locking arms 18 and 20 after the latches 40 and 42 are pivoted out of engagement with the pins 50 and 52. In order to provide for the locking engagement of the locking levers 18 and 20 with the ICC bar 100 of a truck in its final parked position, two sets of locking teeth are provided on each locking bar 18 and 20. The teeth 104 and 106 are located on the locking bar 18 and the teeth 108 and 110 are provided on the locking bar 20. All of the teeth are identical in construction and include two offset ICC bar engaging surfaces a and b which will prevent the movement of the truck or trailer away from the loading dock. The two locking arms 18 and 20 are pivoted independently of each other so that if the apex of a tooth on one bar should strike the bottom of the ICC bar 100 as shown in FIG. 2, the other locking bar will still be free to pivot upwardly to bring one of the teeth thereon into position for engagement with the ICC bar 100 should an attempt be made to pull the truck or trailer away from the loading dock 16.

The standard ICC bar on a truck or trailer is generally disposed with the bottom edge thereof between 23 inches and 26½ inches above the ground. Since the position of the ICC bar relative to the end of the truck or trailer may vary due to different constructions or due to damage where the ICC bar supporting frame is bent forwardly from the rear end of the truck or trailer, the provision of two spaced apart teeth on each locking bar with each tooth having a stepped engaging surface will permit the effective locking of the truck or trailer relative to the loading dock at least 98 percent of the time. There will always be some trucks or trailers without an ICC bar or with an ICC bar so mispositioned or damaged that special locking provisions will have to be made.

In summary, the operation of the locking device is completely automatic in locking a truck in position relative to the loading dock and only requires manual assistance in the disengagement of the looking bars from the ICC bar after a loading or unloading operation has been fully completed. When a truck is backing up to the loading dock, the ICC bar 100 will engage the camming surfaces 98 on the activating arms 62 and 64 as shown in FIG. 1. As the truck continues to back towards the loading dock 16, the activating arms 62 and 64 will be pivoted in a counterclockwise direction about the pivot stud 82 against the force of the springs 88 and 90. The pivotal movement of the activating arms 62 and 64 will cause the plungers 70 and 72 to press downwardly on the upper surface of the projections 65 and 67 on the latch members 40 and 42 thereby pivoting the latch members 40 and 42 in a counterclockwise direction about pivot stud 44. This will cause the locking pins 50 and 52 to be separated from the recesses in the latch members 40 and 42, respectively thereby allowing the locking arms 18 and 20 to pivot upwardly about the pivot stud 22 under the influence of the spring 32 to bring the locking pins 50 and 52 into engagement with the cam surfaces 102 on the activating arms 62 and 64. Due to the curvature of the cam surfaces 102 the locking arms 18 and 20 cannot freely swing up into engagement with the ICC bar but will move upwardly in a controlled manner as the locking pins 50 and 52 traverse the cam surfaces 102 upon continued counterclockwise pivotal movement of the activating arms 62 and 64 as the truck continues to back towards the loading dock 16. Continued counterclockwise pivotal movement of the activating arms 62 arms 62 will cause the plungers 70 and 72 to move off the end of the projections 66 and 68 thereby permitting the latch members 40 and 42 to be pivoted in the clockwise direction about the pivot stud 44 under the influence of the springs 54 and 56 until the lateral flanges 66 and 68 engage the inclined end surface of the main support member 12. By the time the end of the truck abuts against the bumpers on the loading dock 16, the locking pins 50 and 52 will have reached the upper ends of the cam surfaces 102 thereby permitting one of the teeth on one of the locking arms to move into locking position relative to the ICC bar 100 to prevent unauthorized withdrawal of a truck away from the loading dock. While a minimum amount of play might be present between the ICC bar 100 and the selected tooth, this will be insufficient to cause any dangerous separation between the bed of the truck and the upper surface of the loading dock since most loading docks have an overlapping lip which extends over the upper surface of the truck bed. Such overlapping lips are common with respect to dock leveling devices and the overall height of the locking device according to the present invention is sufficiently low so that the looking device will not interfere with any of the standard leveling devices presently used on loading docks.

When a loading or unloading operation has been completed and it is safe for the truck or trailer to be pulled away from the loading dock, an operator simply pulls on the free ends of the cables 114 which are secured at one end to each of the locking bars 18 and 20. The cables 114 are guided about suitable pulley means 112 so that the free ends of the cables 114 can be positioned in a convenient location on the loading dock. Movement of the cables 114 in the direction of the arrow F causes the locking arms 18 and 20 to be pivoted in a clockwise direction about the pivot stud 22 against the force of the spring 32 from the position shown in FIG. 2 to the position shown in FIG. 1. As the locking pins 50 and 52 contact the latch members 40 and 42, they will cause the latch members to pivot in the counterclockwise direction as viewed in FIG. 1 against the force of the springs 54 and 56 to allow the pins 50 and 52 to enter the recesses 48 and 49. The springs 54 and 56 will then pivot the latch members 40 and 42 into locking engagement with the locking pins 50 and 52. The activating arms 62 and 64, however, will remain in the position shown in FIG. 2 until such time as the truck or trailer is pulled away from the loading dock 16. At that time, the springs 88 and 90 will pivot the activating arms 62 and 64 in the clockwise direction as viewed in FIGS. 1 and 2 to return the arms to the position shown in FIG. 1. As mentioned previously, the lower ends of the projections 65 and 67 are beveled so that upon engagement of the spring biased plungers 70 and 72 with the projections, the plungers will be forced inwardly as the plungers move past the projections. When the activating arms 62 and 64 reach the position shown in FIG. 1 the plungers 70 and 72 will be located above the projections 65 and 67 and will be biased outwardly into engagement with the upper surfaces of the projections thereby readying the locking device for a subsequent looking operation.

Figure 5:
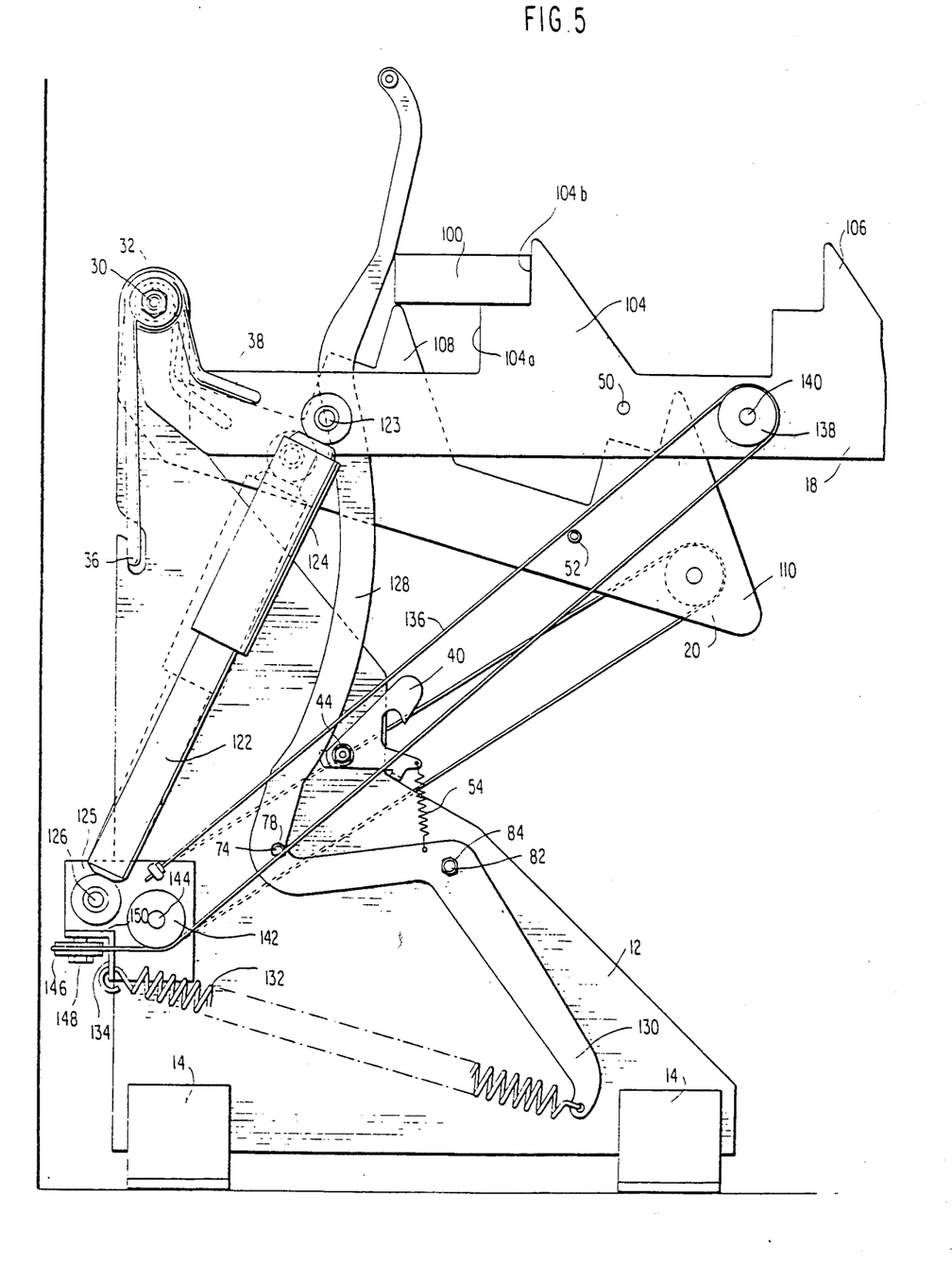
FIG. 5 is a side elevation view of the truck locking device according to another embodiment of the present invention.

In the embodiment of FIG. 5 those elements which are common to the embodiment of FIGS. 1-4 inclusive are indicated by the same reference numerals. The principal difference resides in the addition of a fluid-type check device 120 secured between each arm 18, 20 and the support member 12. Each check device 120 is comprised of two telescopic members 122 and 124 having fluid control means therein which resist the elongation of the device while allowing for easy shortening of the device. The member 124 of check device 120 is pivotally connected to the arm 18 by means of pivot 123 and the member 122 is pivotally connected to a bracket 125 by means of a pivot 126. The bracket 125 is secured to one side of the support member 12. An identical brackel (not shown) is secured to the other side of the support member 12 directly behind the bracket 125 and therefore is not visible. The other check device for arm 20 is pivotally connected in the same manner. Thus, when the latch members 40 and 42 are pivoted to release the arms 18 and 20, the upward movement of the arms 18 and 20 under the influence of the spring 32 will be slowed by the check devices.

In FIG. 5, the activating arms, only one of which is ilustrated at 128, differ from the activating arms 62 and 64 in that each lower portion 130 of each arm is longer and is biased by a larger and stronger spring 132 secured between the free end of the portion 130 and a flange 134 on the bracket 125. This provides additional restraint to the upward movement of the arms 18 and 20 due to the engagement of the pins 50 and 52 with the curved surfaces of the activating arms.

The retracting mechanism for arms 18 and 20 in FIG. 5 is slighty different and will only be described with respect to arm 18. A cable 136 is secured at one end to bracket 125 by any suitable means and is directed over pulley 138 which is rotatably mounted on arm 18 by shaft 140. The cable 136 is then directed under pulley 142 which is rotatably mounted on braoket 125 by shaft 144. Finally, the cable 136 is directed about pulley 146 which is rotatably mounted on shaft 148 secured to flange 150 extending outwardly from the bracket 125. Thus, the pulley 146 directs the cable laterally away from the truck locking device for actuation by any suitable manual or mechanical means.

Figure 6:
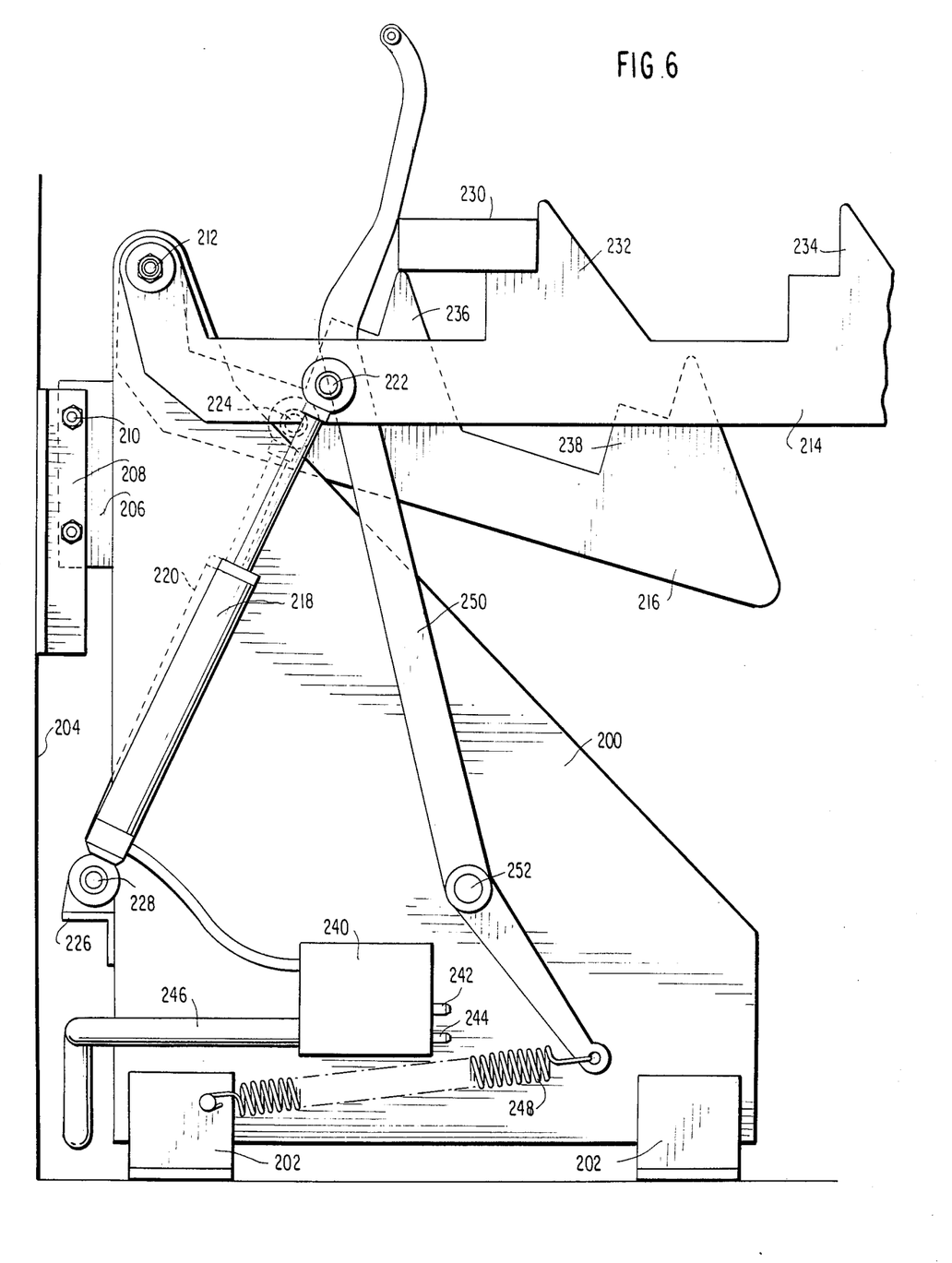
FIG. 6 is a side elevation view of the truck locking device according to a further embodiment of the present invention.
Figure 7:
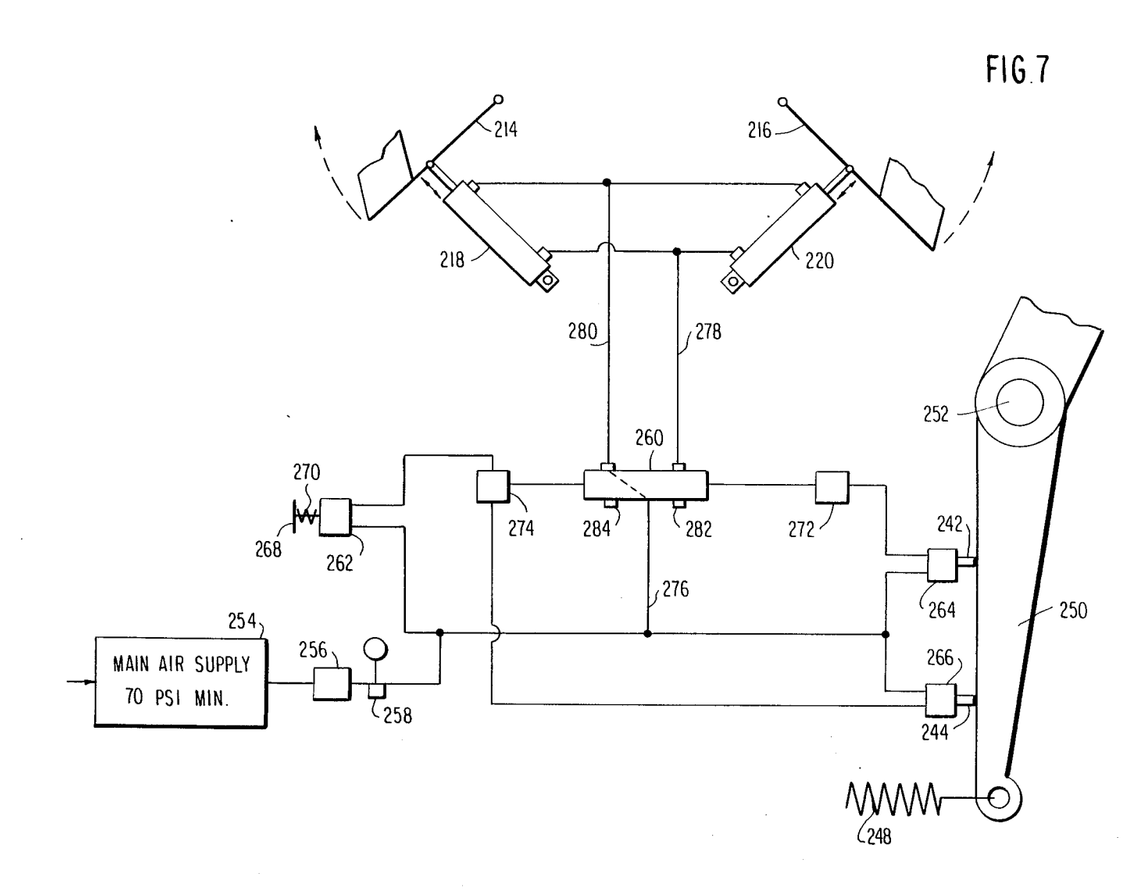
FIG. 7 is a schematic diagram of the pneumatic circuit for the device shown in FIG. 6.

The truck locking device shown in the embodiment of FIGS. 6 and 7 is comprised of a support member 200 in the form of a substantially triangular flat steel plate similar to the plate 12 as shown in the previous embodiments. Support feet 202 in the form of angle irons are secured to the side of the support member by means of welding or the like adjacent the bottom edge thereof. The horizontal portions of each foot 202 may be provided with holes for receiving bolts which are set in concrete in order to secure the position of the support member 12 in close proximity to the loading dock 204. In order to stabilize the upper end of the support member 200 an extension 206 is secured to or of one piece construction with the support member 200. The extension 206 is secured between a pair of angle irons 208 by means of bolts 210. The angle irons 208 may be secured to the loading dock 204 by bolts or any other suitable means. A horizontally disposed stud 212 extends through and is secured in an aperture in the uppermost end of the support member 200 to provide two horizontally disposed locking arm supports similar to the supports disclosed in the previous embodiments. Locking arms 214 and 216 are pivotally mounted on the oppositely extending portions of the stud 212 and are secured thereon in the manner disclosed in previous embodiments. A pair of double acting pneumatic cylinders 218 and 220 are pivotally connected at their upper ends to the locking arms 214 and 216 respectively by means of pivotal connections 222 and 224. A pair of support brackets 226, only one of which is shown in FIG. 6, are secured to the support plate 200 on opposite sides thereof. The lower end of the double acting pneumatic cylinders 218 and 220 are pivotally connected to the support brackets 226 by means of suitable pivot connections 228.

The locking arm 214 is provided with a pair of stepped locking teeth 232 and 234 and the locking arm 216 is provided with a pair of stepped locking teeth 236 and 238 which are adapted to engage the ICC bar 230 on the rear of the truck in a manner similar to that described above with respect to the previous embodiments.

A pair of actuating arms 250 are pivoted to the support plate 200 by means of a suitable pivot pin 252 extending through the support plate 200. The pivoting arrangement and interconnection of the arms 250, only one of which is shown in FIG. 6, would be identical to that disclosed in the previous embodiments.

When at least one of the locking arms 214 or 216 is engaged with the ICC bar 230 on a truck the activating arms 250 will be disposed in the position shown in FIG. 6 with the lower end thereof spaced from the valve plungers 242 and 244 extending from the pneumatic control box 240 secured to one side of the support plate 200 by any suitable means. The fluid lines leading to the pneumatic control box 240 are located in a conduit 246. When the locking arms 214 and 216 have been lowered away from the ICC bar to allow the truck to move away from the loading dock 204, the activating arms 250 will be pivoted in the clockwise direction about the pivot pin 252 by means of a spring 248 connected between the lower end of the activating arm 250 and a suitable point on the support frame. Thus, in the absence of the truck being positioned at the loading platform, the lower end of the locking arm 250 will be disposed relative to the plungers 242 and 244 in the manner shown in FIG. 7.

The raising and lowering operation of the locking arms 214 and 216 is best described with reference to FIG. 7 which discloses the pneumatic diagram of the pneumatic circuit. A main air supply 254 may consist of an air pump or other suitable supply means which will supply pressurized air at 70 psi. The pressurized air passes through filter 256 and gauge 258 and is directed to an air pilot four-way valve 260 as well as to a normally closed three way valve 262, a normally open three way valve 264 and a normally closed three way valve 266. The valve 262 is operated by means of a manual push button 268 which is biased outwardly by means of a spring 270 to maintain the valve 262 in the normally closed condition. The plungers 242 and 244 associated with the valves 264 and 266 are also spring biased outwardly so that when the activating arm 250 is in the position shown in FIG. 6, the valve 264 will be open and the valve 266 will be closed. A pulse valve 272 is located in the line leading from the valve 264 to the valve 260 and a shuttle valve 274 is located between the valve 260 and the valves 262 and 266. The locking arms 214 and 216 are shown in the lowered position in FIG. 7 and the activating arm 250 is in the position indicative of the absence of a truck.

When a truck is backing up to the loading dock 204 the activating arm 250 will be pivoted from the position shown in FIG. 7 to the position shown in FIG. 6. Thus, the valve 264 will be moved from the closed position to the open position thereby supplying a pulse of pressure to the valve 260 through the pulse valve 272 in order to shift the pilot valve within the valve 260 to the position connecting the main supply line 276 to the supply line 278 which is connected to the lower end of both cylinders 218 and 220 to thereby raise both locking arms 214 and 216 into engagement with the ICC bar 230 on the back of the truck.

The air cylinders 218 and 220 operate rather slowly so that if the truck pulls away from the loading dock 204 before the locking arms 214 and 216 engage the ICC bar 230, the activating arm 250 will be pivoted to the position shown in FIG. 7 to open the valve 266 thereby applying pressure through the shuttle valve 2 to the left end of the pilot valve within the valve 260 to apply air under pressure from the main supply line 276 to the supply line 280 to thereby lower the arms 214 and 216. Whenever the lines 278 or 280 are pressurized, the air under pressure in the other line will be exhausted through the adjustable exhaust ports 282 and 284.

Once the ICC bar is lockingly engaged by one or both of the locking arms 214 and 216 as shown in FIG. 6, it will be impossible for the unauthorized removal of the truck from the loading dock 204. When it is permissible for the truck to leave the manual pushbutton 268 associated with the valve 262 is pushed inwardly to open the valve 262 and thereby applying pressure through the shuttle valve 274 to the left end of the pilot valve within the valve 260 to thereby apply air under pressure from the main supply line 276 to the supply line 280 to thereby lower the arms 214 and 216. The valve 262 is generally located somewhere on the loading dock 204 for operation by a person in charge of the truck loading operation. Suitable red and green signal lights may also be provided somewhere on the loading dock which are operatively associated with the position of the locking arms 214 and 216 to give the driver a visual indication as to whether or not his truck is held in locked condition by the locking device. Such signal lights are conventional in the art and are not illustrated in the present application.

While the foregoing embodiment discloses the use of pneumatic means for raising and lowering the locking arms, it is obvious that hydraulically actuated means could also be utilized for raising and lowering the arms into and out of locking engagement with the ICC bar on the rear of a truck.

While the locking device according to the present invention is primarily useable in conjunction with a loading dock, it is possible to use the locking device for securing a truck or trailer in any other specific location such as a parking lot or the like. The use of the locking device eliminates the need for wheel chocks or any other manually operated locking means thereby completely eliminating the possibility of human error in failing to properly secure a truck or trailer.

While the invention has been particularly shown and described with reference to a preferred embodiment thereof, it will be understood by those in the art that various changes in form and details may be made therein without departing from the spirit and scope of the invention.

What is claimed is:

1. A truck locking device comprising support means adapted to be secured on a suitable suport surface, horizontally extending pivot means secured to said support means, locking arm means having at least one projection thereon pivotally mounted on said pivot means, operating means connected to said locking arm means for moving said locking arm means upwardly for engagement with a horizontally disposed bar secured to a truck, an activating arm means pivotally mounted on said support means, control means engageable by said activating arm means for operatively controlling said operating means whereby upon engagement of said bar with said activating arm means said activating arm means will be pivoted to cause said control means to initiate operation of said operating means to move said locking arm means upwardly into locking engagement with said bar to secure the truck in position relative to said support means.

2. A truck locking device as set forth in claim 1 wherein said locking arm means are comprised of two arms each pivoted at one end thereof to said support means on opposite sides thereof for independent movement with each arm having a plurality of upstanding projections thereon for engaging said bar at varying locations.

3. A truck locking device as set forth in claim 2 wherein said operating means are comprised of two double acting fluid operated cylinder means pivotally connected between said two arms respectively and said support means on the opposite sides thereof for moving said arms into and out of engagement with said bar.

4. A truck locking device as set forth in claim 3 wherein said control means includes first valve means mounted on said support means for operative engagement by said activating arm means upon pivotal movement of said activating arm means to initiate operation of said double acting fluid operated means in a direction to move said locking arms upwardly into engagement with said bar and second manually operated valve means adapted to be mounted at a location remote from said truck locking device for actuating said double acting fluid operated means in a direction to move said locking arms out of engagement with said bar.

5. A truck locking device as set forth in claim 4 further comprising third valve means mounted on said support means for operative engagement by said activating arm means for initiating movement of said double acting fluid operated means to move said locking arms downwardly if a truck should move out of operative engagement with said activating arm means prior to being engaged by said locking arms.

* * * * *